(12) United States Patent
Stern et al.

(10) Patent No.: US 10,089,571 B2
(45) Date of Patent: Oct. 2, 2018

(54) TWO-PIECE TRANSACTION CARD CONSTRUCTION

(71) Applicant: Capital One Services, LLC., McLean, VA (US)

(72) Inventors: Matthew Stern, San Francisco, CA (US); Makiko Taniguchi, San Francisco, CA (US); Dan Makoski, Palo Alto, CA (US); Lin Yang, San Francisco, CA (US); Carl Cepress, Mountain View, CA (US); Austin Anderson, San Francisco, CA (US); Jason Deperro, San Mateo, CA (US); Elwin Ong, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/875,213

(22) Filed: Jan. 19, 2018

(65) Prior Publication Data

US 2018/0144229 A1    May 24, 2018

Related U.S. Application Data

(63) Continuation of application No. 15/236,305, filed on Aug. 12, 2016, now Pat. No. 9,965,716.

(60) Provisional application No. 62/205,396, filed on Aug. 14, 2015, provisional application No. 62/242,039, filed on Oct. 15, 2015.

(51) Int. Cl.
*G06K 19/077* (2006.01)

(52) U.S. Cl.
CPC . *G06K 19/07722* (2013.01); *G06K 19/07724* (2013.01)

(58) Field of Classification Search
USPC .................................................. 235/492, 487
See application file for complete search history.

(56) References Cited

U.S. PATENT DOCUMENTS

| | | | |
|---|---|---|---|
| 4,639,585 | A | 1/1987 | Haghiri-Tehrani et al. |
| 4,994,659 | A | 2/1991 | Yabe et al. |
| 5,057,679 | A | 10/1991 | Audic et al. |
| 5,888,624 | A | 3/1999 | Haghiri et al. |
| 5,969,951 | A | 10/1999 | Fischer et al. |
| 2003/0102541 | A1 | 6/2003 | Gore et al. |
| 2004/0223305 | A1 | 11/2004 | Amiot et al. |
| 2005/0001039 | A1 | 1/2005 | Oddou et al. |
| 2006/0139901 | A1 | 6/2006 | Meireles |
| 2014/0263663 | A1 | 9/2014 | Pueschner |

(Continued)

*Primary Examiner* — Allyson Trail
(74) *Attorney, Agent, or Firm* — Finnegan, Henderson, Farabow, Garrett & Dunner, LLP

(57) ABSTRACT

The disclosed embodiments generally relate to transaction card constructions, and particularly, to a two-piece transaction card construction. Disclosed embodiments include a generally planar first card component including a first surface and a generally planar second card component including a second surface wherein the first card component is separate from the second card component. In disclosed embodiments, for example, the generally planar first card component and the generally planar second card component may be configured such that one forms a cavity and the other forms an inlay component configured to be seated within the cavity. In other embodiments the generally planar first card component and the generally planar second card component may be configured such that one forms a container and the other forms a lid configured to close the container.

20 Claims, 10 Drawing Sheets

(56) References Cited

U.S. PATENT DOCUMENTS

2015/0076240 A1 3/2015 Daniel
2015/0144703 A1 5/2015 Droz
2017/0109622 A1 4/2017 Cepress

TWO-PIECE TRANSACTION CARD CONSTRUCTION

PRIORITY CLAIM

This application is a continuation of U.S. patent application Ser. No. 15/236,305, filed Aug. 12, 2016, which claims priority under 35 U.S.C. § 119 to U.S. Provisional Application No. 62/205,396, filed on Aug. 14, 2015, and entitled "Two-Piece Transaction Card Construction," and claims priority under 35 U.S.C. § 119 to U.S. Provisional Application No. 62/242,039, filed on Oct. 15, 2015, and entitled "Two-Piece Transaction Card Construction". The disclosures of the above-identified applications are expressly incorporated herein by reference in their entireties.

TECHNICAL FIELD

The disclosed embodiments generally relate to transaction card constructions, and particularly, to a two-piece transaction card construction.

BACKGROUND

Transaction cards, such as credit and debit cards, have increasingly become a primary means for customers to complete financial transactions. Typically, transaction cards are cast out of a plastic material as a single piece. For example, a typical credit card may be manufactured out of plastic such as polycarbonate (PC) or polyvinyl chloride (PVC) using an injection molding process. The plastic card may then be modified to add functional and/or visual features. For example, a magnetic strip may be affixed to one side, the card may be stamped with the card number and customer name, and color or a design may be added for appearance.

But many transaction card providers are moving away from using magnetic strip technology and now additionally or alternatively include more advanced transaction components attached to or embedded within a transaction card. For example, some transaction cards now include microchips (e.g., microchips based on the Europay, MasterCard, and Visa standard, also called "EMV chips") that more securely and efficiently manage card and customer information. Some cards now include near field communication (NFC) and/or radio-frequency identification (RFID) components that can wirelessly communicate with outside devices (e.g., a point of sale device, mobile device, etc.). While these types of technology provide several advantages to customers, the conventional, one-piece transaction card construction may not be ideal for providing them in a transaction card.

For example, in order to accommodate more recent technology in a traditional single-piece card, the card must be milled to create space for an transaction component (e.g., an EMV chip) and/or the plastic material may be cast around an transaction component (e.g., an NFC antenna) during the manufacturing process. These processes, however, limit the transaction cards to being used with that particular transaction component. In other words, a conventional, one-piece transaction card is not configured to adapt to multiple types of transaction components. For example, if a transaction card is milled to include a space for an EMV chip, the card is limited to microchips that fit in that space. Similarly, if card material is cast around an NFC antenna, the NFC antenna cannot be removed without destroying the transaction card.

Conventional transaction cards suffer from additional drawbacks. For example, typical materials used to manufacture the cards (e.g., PC and PVC plastic) result in transaction cards that are not very durable, are prone to scratches, wear, and becoming dirty or stained, and lack any ergonomic features and/or textural feel. In general, one-piece constructions limit the sophistication and potential utility of a transaction card by effectively removing the potential for customization and interchangeability.

The present disclosure is directed to overcoming one or more of the problems set forth above and/or other problems associated with conventional transaction card constructions.

SUMMARY

The disclosed embodiments relate to a credit card that includes a two-piece construction.

In one aspect, the present disclosure is directed to a transaction card. The transaction card may include a generally planar first card component including a first surface. The transaction card may also include a generally planar second card component including a second surface and defining a cavity. The first card component may be separate from the second card component and at least partially insertable into the cavity. The first surface may form a first exterior surface and the second surface may form a second exterior surface when the first card component is in the cavity. The transaction card may be defined by a thickness of less than approximately 2 mm.

In another aspect, the present disclosure is directed to a method of manufacturing a transaction card. The method may include forming a generally planar first card component from a first material. The method may also include forming a generally planar second card component from a second material, the second card component including a cavity. The method may further include inserting the first card component into the cavity and attaching the first card component to the second card component. The first material may be different than the second material. The transaction card may be defined by a thickness of less than approximately 2 mm.

In another aspect, the present disclosure is directed to a transaction card, the transaction card including a card frame. The card frame may include a generally planar first card component defining a space and a generally planar second card component, separate from the first card component and attachable thereto to at least partially enclose the space. The card frame may be configured to hold at least one transaction component in the space and may be defined by a thickness that is less than 0.10 inches.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include a two-piece transaction card. For example, disclosed embodiments include a two-piece transaction card having two separate card components that may be freely movable independent of each other and connectable to form the transaction card. In some embodiments, the two card components, when connected, may define a space for receiving at least one transaction component. Various methods may be used to manufacture the separate card components out of different types of materials that are suitable for satisfying certain criteria or preferences. In addition, the construction of the separate components may allow for ease of assembly, as well as customization and interchangeability.

The term "transaction card," as used herein, may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), to another device. Examples of transaction cards include credit cards, debit cards, gift cards, rewards cards, frequent flyer cards, merchant-specific cards, discount cards, identification cards, and driver's licenses, but are not limited thereto.

Figure 1:
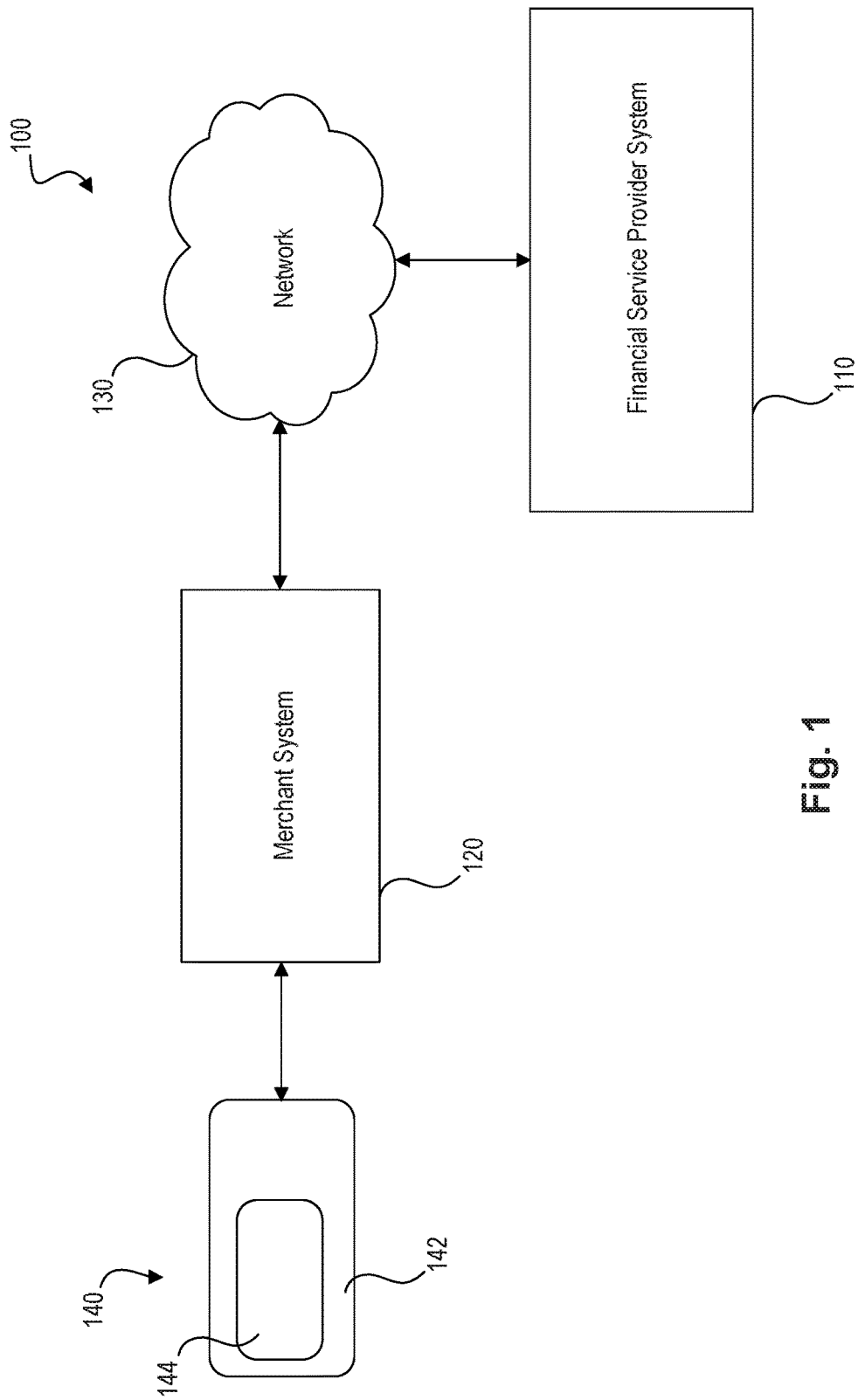
FIG. 1 is a block diagram of an example of a transaction system, consistent with disclosed embodiments.

FIG. 1 illustrates a transaction system 100. Transaction system 100 may be a computing system configured to receive and send information between the components of transaction system 100 and with components outside of system 100. Transaction system 100 may include a financial service provider system 110 and a merchant system 120 connected by a network 130. It should be understood, however, that transaction system 100 may include additional and/or alternative components.

Financial service provider system 110 may be one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account known to those skilled in the art. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online. In some embodiments, financial service provider system 110 may be associated with an organization other than a financial institution, including a gift or reward card administrator, an airline or frequent flyer administrator, a merchant (which may in some embodiments be associated with merchant system 120), a government institution (e.g., an agency), or the like.

Merchant system 120 may be one or more computer systems associated with a merchant. For example, merchant system 120 may be associated with an entity that provides goods and/or services (e.g., a retail store). The merchant may include brick-and-mortar location(s) that a customer may physically visit and purchase goods and services. Such physical locations may include computing devices (e.g., merchant system 120) that perform financial service transactions with customers (e.g., POS terminal(s), kiosks, etc.). Additionally or alternatively, merchant system 120 may be associated with a merchant who provides electronic shopping mechanisms, such as a website or a similar online location that consumers may access using a computer through browser software, a mobile application, or similar software. Merchant system 120 may include a client device, such as a laptop computer, desktop computer, smart phone, or tablet, that a customer may operate to accesses the electronic shopping mechanism.

Network 130 may be any type of network that facilitates communications and data transfer between components of transaction system 100, such as, for example, financial service provider system 110 and merchant system 120. Network 130 may be a Local Area Network (LAN), a Wide Area Network (WAN), such as the Internet, and may be a single network or a combination of networks. Network 130 is not limited to the above examples and transaction system 100 may implement any type of network that allows the entities (shown and not shown) of transaction system 100 to exchange data and information.

Transaction system 100 may be configured to conduct a transaction associated with the use of a transaction card 140. In one example, financial service provider system 110 may provide transaction card 140 to a customer for use in conducting transactions associated with a financial service account held by the customer. In an example of one such transaction, the customer may use transaction card 140 at a merchant location to make a purchase. During the course of the purchase, information may be transferred from transaction card 140 to merchant system 120 (e.g., a point of sale device). Merchant system 120 may communicate with financial service provider system 110 via network 130 to complete the transaction. For example, merchant system 120 may receive account information from transaction card 140. Merchant system 120 may transmit the account information and a purchase amount, among other transaction information, to financial service provider system 110. Financial service provider system 110 may settle the transaction by transferring funds from the customer's financial service account to a financial service account associated with the merchant.

While transaction system 100 and transaction card 140 are depicted and described in relation to transactions that involve customers, merchants, and financial service providers, it should be understood that these entities are used only as an example to illustrate one environment in which transaction card 140 may be used. Moreover, it should be understood that transaction card 140 is not limited to financial products and may be any physical card product that is configured to provide information to another device. For example, transaction card 140 may be an identification card configured to provide information to a device in order to identify the holder of the card (e.g., driver's license) or provide information about the holder of the card (e.g., insurance card).

In an embodiment, transaction card 140 may include a card frame 142. In some embodiments, card frame 142 may include at least two separate components that, when secured to each other, form transaction card 140. For example, transaction card 140 may include two-piece construction that includes a first card component that forms a first surface of transaction card 140 and a second card component that forms a second surface of transaction card 140. Additional components may also be included.

In some embodiments, transaction card 140 may further include an transaction component 144. Transaction component 144 may include one or more electronic devices and/or elements configured to receive, store, process, provide, transfer, send, delete, and/or generate information. For example, transaction component 144 may be a microchip (e.g., EMV chip), a communication device (e.g., NFC antenna, Bluetooth® device, WiFi device, RFID device), etc. Transaction component 144 may be secured to card frame 142 in such a way that allows card frame 142 to carry transaction component 144 while maintaining a utility of transaction component 144 (i.e., allowing transaction component 144 to interact with merchant system 120). In other embodiments, transaction component 144 need not necessarily be electronic. For example, in some embodiments, component 144 may comprise one or more of a magnetic strip, a barcode, a Quick Response (QR) code, or the like.

Figure 2:
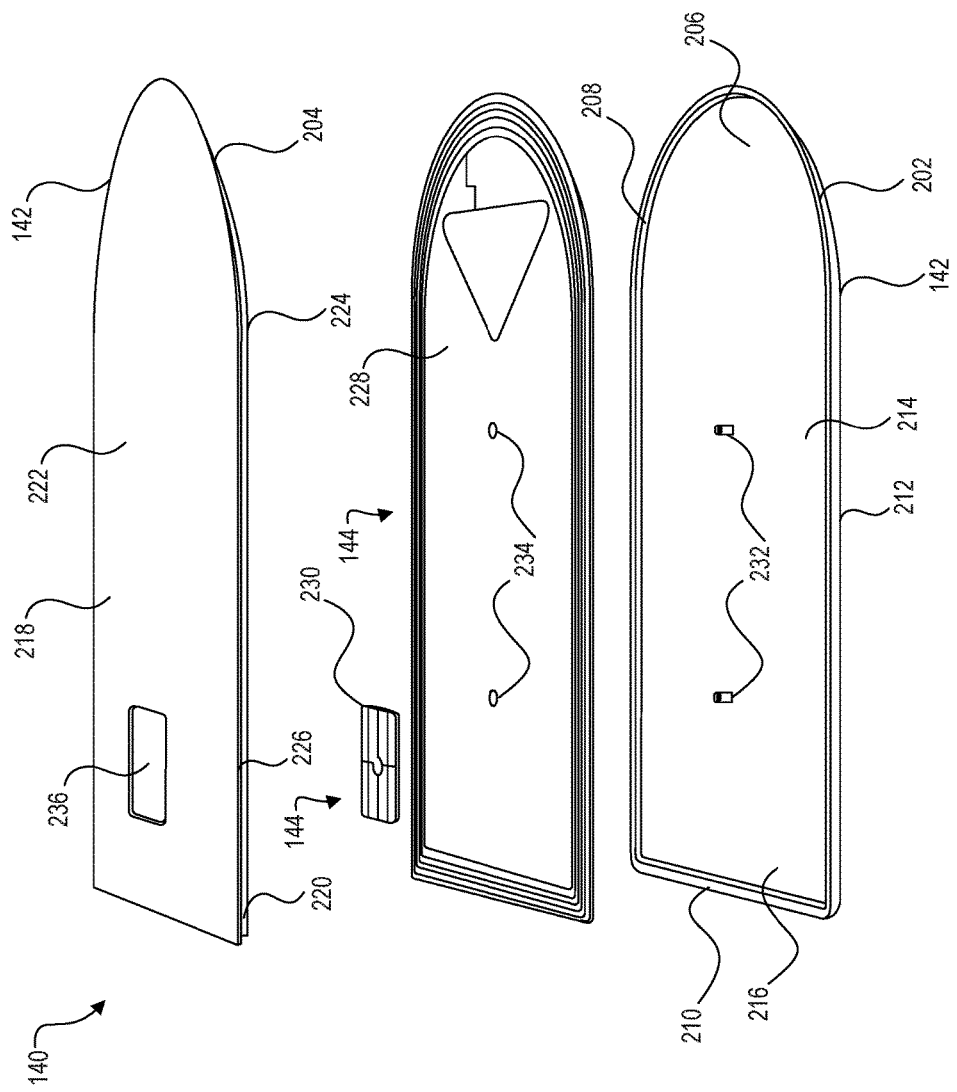
FIG. 2 is an exploded-view illustration of a transaction card, consistent with disclosed embodiments.

FIG. 2 illustrates an embodiment of transaction card 140. In the embodiment of FIG. 2, transaction card 140 includes a two-piece construction. For example, card frame 142 may include two separate, independently movable card components: a generally planar lower card component 202 and a generally planar upper card component 204. For example, in one embodiment, card frame 142 may include cavity/inlay construction in which lower card component 202 forms a cavity and upper card component 204 forms an inlay component configured to be seated within the cavity. It should be understood, however, that other configurations are possible. For example, transaction card 140 may include a "bucket-and-lid" construction in which lower card component 202 forms a container and upper card component 204 forms a lid that is configured to close the container and that rests on a rim of lower card component 202.

In an embodiment, lower card component 202 may include a bottom wall 206, a projecting wall 208, and a lip 210. Bottom wall 206 may define a first side of transaction card 140. For example, a bottom surface of bottom wall 206 may form a first exterior surface 212 of transaction card 140. In addition, a top surface of bottom wall 206 may form a first interior surface 214. Projecting wall 208 may extend away from bottom wall 206 and form at least a portion of a thickness of transaction card 140. Bottom wall 206 and projecting wall 208 may together define a cavity in a space 216. Lip 210 may be a surface that is formed by a thickness of projecting wall 208 and/or is a separate surface that extends away from projecting wall 208 (toward and/or away from space 216). Lip 210 may form a support surface for at least a portion of upper card component 204.

In an embodiment, upper card component 204 may include a top wall 218 and an alignment wall 220. Top wall 218 may define a second side of transaction card 140. For example, a top surface of top wall 218 may form a second exterior surface 222 of transaction card 140. In addition, a bottom surface of top wall 218 may form a second interior surface 224. In some embodiments, alignment wall 220 may define a thickness of upper card component 204. For example, alignment wall 220 may be a beveled edge of top wall 218. In other embodiments, alignment wall 220 may extend away from top wall 218 at a distance spaced from an edge of top wall 218. In this way, alignment wall 220 and a perimeter portion of top wall 218 may define a channel 226 that extends around at least a portion of the perimeter of top wall 218. Alignment wall 220 may cover an entire middle portion of top wall 218 or may be formed as a border with a space therebetween. Further, it should be understood that some embodiments may not include alignment wall 220.

Lower card component 202 and upper card component 204 may be securable to each other to at least partially enclose space 216. For example, upper card component 204 may be placed on top of lower card component 202 such that a perimeter portion of top wall 218 rests on lip 210. Attachment may be guided by alignment wall 220, which may be sized to seat within space 216 such that an outer surface thereof contacts an inner surface of projecting wall 208.

Lower card component 202 and upper card component 204 may be permanently or temporarily secured to each other to form a complete card frame 142. For example, lower card component 202 may be secured to upper card component 204 using an adhesive, or by overmolding, pressure fit, interference fit, clasp, tongue-in-groove, post-and-hole, etc. If lower card component 202 and upper card component 204 are temporarily secured to each other, an attachment feature (e.g., for hinged attachment, sliding attachment, etc.) may be included to allow card frame 142 to be disassembled. Other techniques for securing lower card component 202 to upper card component 204 may be apparent to those of skill in the art.

The configuration of card frame 142, with lower card component 202 secured to upper card component 204, may allow space 216 to hold transaction components 144. In an embodiment, transaction components 144 may include a first transaction component 228 and a second transaction component 230 which are positioned within enclosed space 216. In one example, first transaction component 228 may be an NFC antenna and second transaction component 230 may be an EMV chip. It should be understood, however, that first transaction component 228 and second transaction component 230 are examples, and that other configurations are possible (e.g., transaction card 140 may include additional and/or alternative transaction components, or may include only one of first and second transaction components 228, 230).

Transaction components 144 may be positioned and/or secured within space 216 in any manner. In one embodiment, lower card component 202 and upper card component 204 may be sized such that transaction components 144 are sandwiched therebetween and held in place by pressure and/or lack of space for movement. In other embodiments, transaction components 144 may secured to one or more of lower card component 202 and upper card component 204 with an adhesive or embedded in an adhesive material that is used to attach lower card component 202 to upper card component 204.

In another embodiment, card frame 142 and/or transaction components 144 may include one or more alignment features configured to position and/or secure one or more of transaction components 144 within space 216. For example, lower card component 202 may include a first alignment feature 232 in the form of a plurality of posts. First transaction component 228 may include a second alignment feature 234 in the form of a plurality of openings. The posts of first alignment feature 232 may be placed through the openings of second alignment feature 234 in order to properly position first transaction component 228 within space 262.

In another example, upper card component 204 may include a third alignment feature 236 in the form of one or more openings for receiving at least a portion of second transaction component 230. For example, third alignment feature 236 may include a window or plurality of windows that allows a portion or portions of second transaction component 230 to project therethrough. This allows a contact portion of second transaction component 230 to be exposed outside of space 216. For example, in an embodiment in which second transaction component 230 is an EMV chip, third alignment feature 236 allows a contact portion of the EMV chip to be exposed. In one embodiment (not shown), alignment feature 236 may include a plurality of windows for receiving a plurality of contact adapters for allowing an electrical connection to be established with an EMV chip positioned in space 216.

Figure 3A:
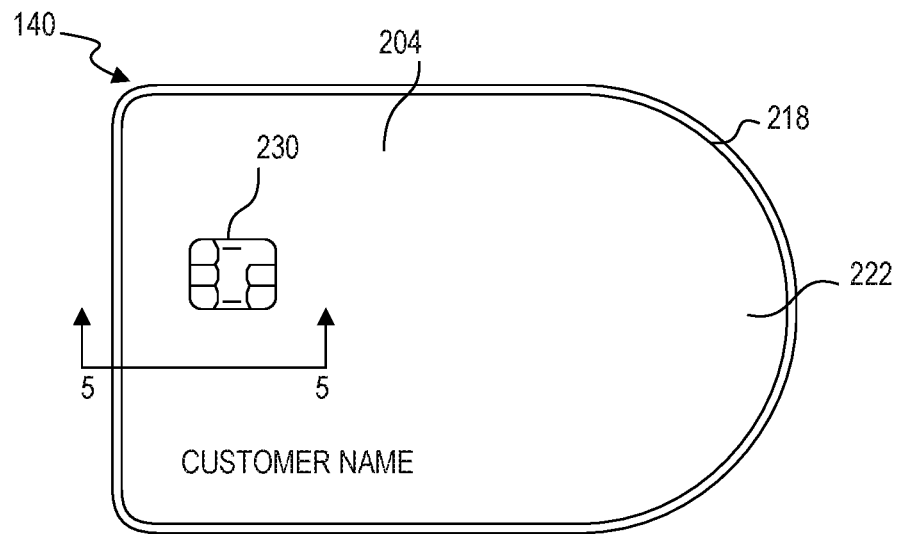
FIG. 3A is a top-view illustration of an embodiment of a transaction card, consistent with disclosed embodiments.
Figure 3B:
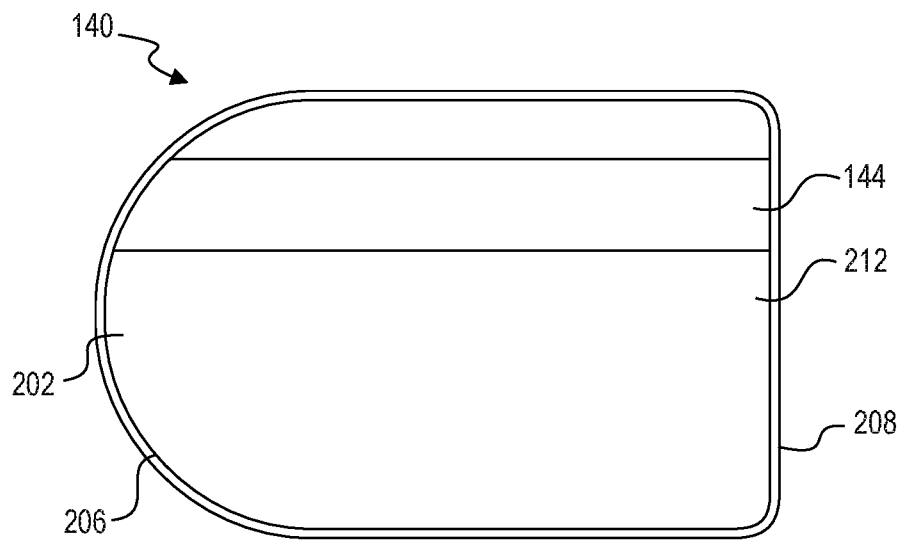
FIG. 3B is a bottom-view illustration of the transaction card of FIG. 3A.

FIGS. 3A-3B further illustrate an embodiment of transaction card 140. FIG. 3A illustrates a top-view of transaction card 140. FIG. 3B illustrates a bottom-view of transaction card 140. As shown in FIGS. 3A-3B, transaction card 140 may include generally planar first exterior surface 212 and generally planar second exterior surface 222. Exterior surfaces 212, 222 may be similar in size to that of conventional transaction cards. Lower card component 202 and upper card component 204 may be configured such that exterior surfaces 212, 222 have any shape, such as a shape selected for its ornamental or aesthetic design. FIGS. 2, 3A, and 3B depict a first such shape. It should be understood, however, that other shapes may be used, such as the shapes depicted in FIGS. 4A-4B, 5A-5B, and 6A-6B, or any other shape.

Figure 4A:
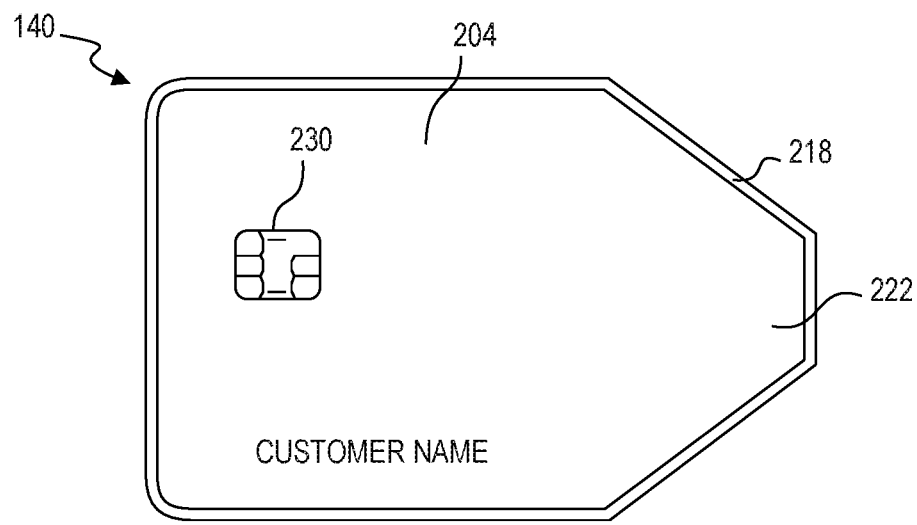
FIGS. 4A-4B are illustrations of a transaction card with an alternative ornamental design.
Figure 4B:
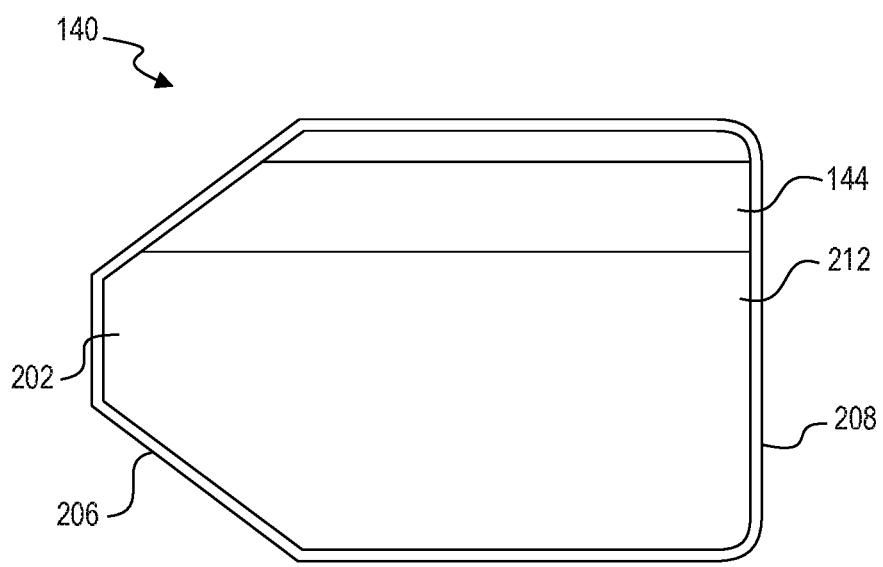
Figure 5A:
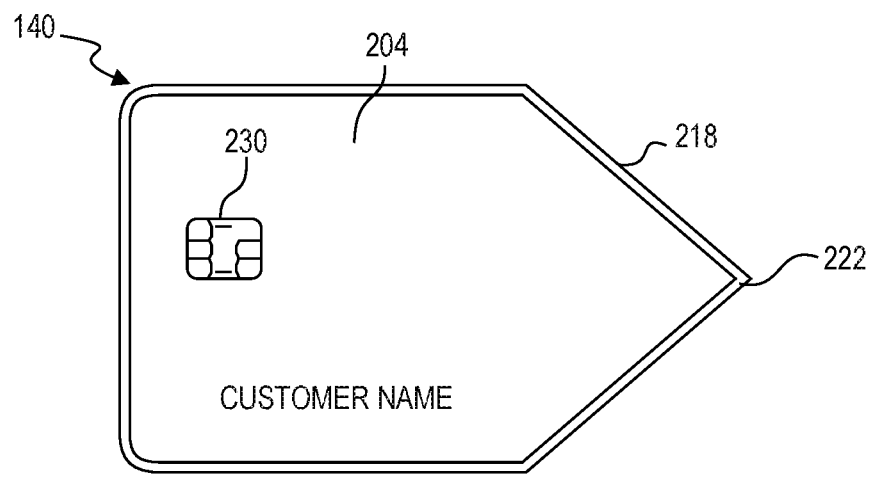
FIGS. 5A-5B are illustrations of a transaction card with another alternative ornamental design.
Figure 5B:
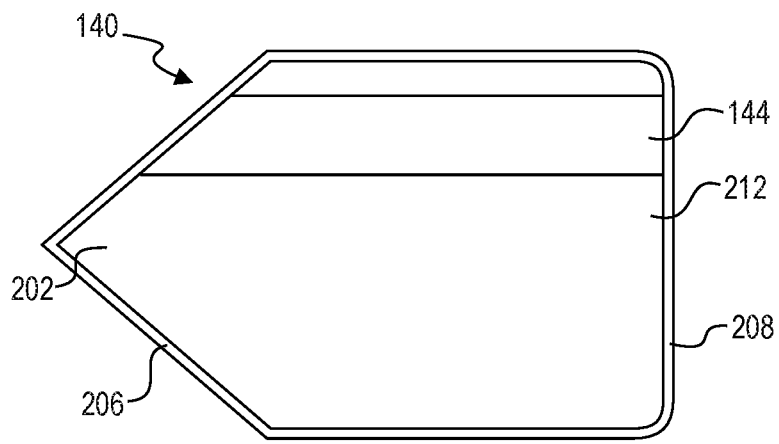
Figure 6A:
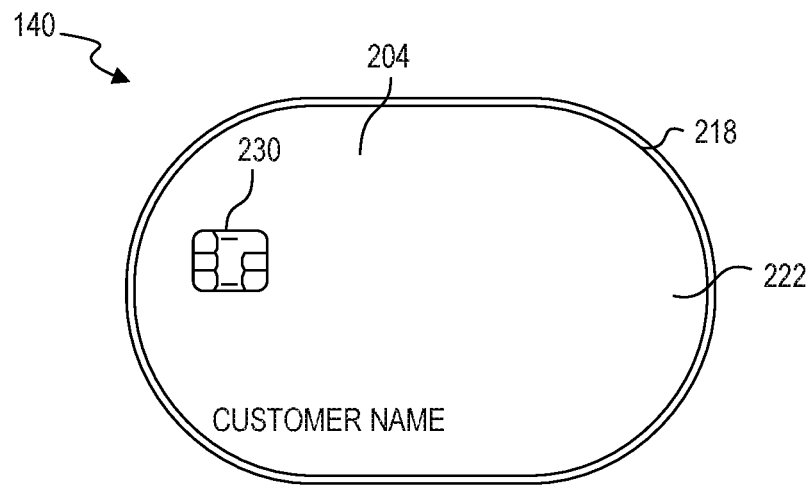
FIGS. 6A-6B are illustrations of a transaction card with yet another alternative ornamental design.
Figure 6B:
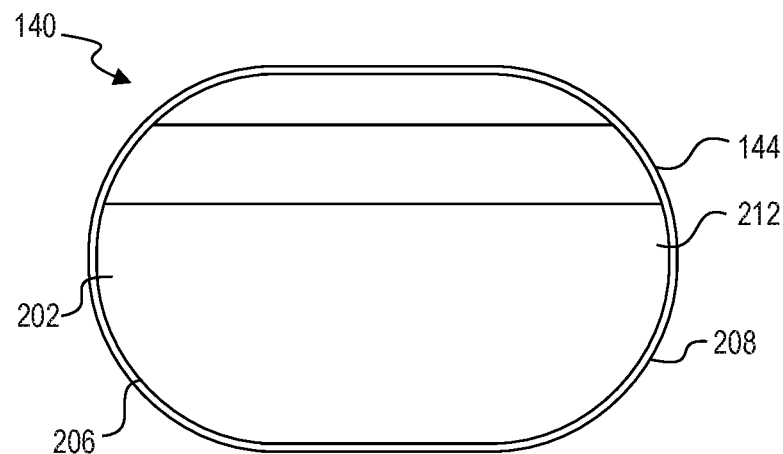

In the first exemplary ornamental design, as depicted in FIGS. 3A-3B, transaction card 140 may include a partially-curved shape in which one end of transaction card 140 is generally rectangular and a second end of transaction card 140 is generally rounded. In other exemplary ornamental designs, the ends of transaction card 140 may include shapes that may be characterized as triangular, angled, rounded, curved, scalloped, etc. FIGS. 4A-4B depict an exemplary design that includes an angled end. FIGS. 5A-5B depict an exemplary design that includes a triangular end. FIGS. 6A-6B depict an exemplary design that includes two rounded ends. Any combination of these are other shapes are possible. A transaction card 140 with the design depicted in FIGS. 2, 3A, 3B is further described below for ease of discussion only, and is not limiting.

As shown in FIGS. 3A-3B, exterior surfaces 212, 222 may form a majority of the exposed surface area of transaction card 140. One or more of exterior surfaces 212, 222 may include additional features, such as identifying information (e.g., card number, customer name, customer signature, expiration date, security code, bar code, QR code, magnetic strip, etc.), additional transaction components 144, visual features (e.g., colors, designs, pictures, logos, bar codes, QR codes, etc.), and the like.

Figure 7:
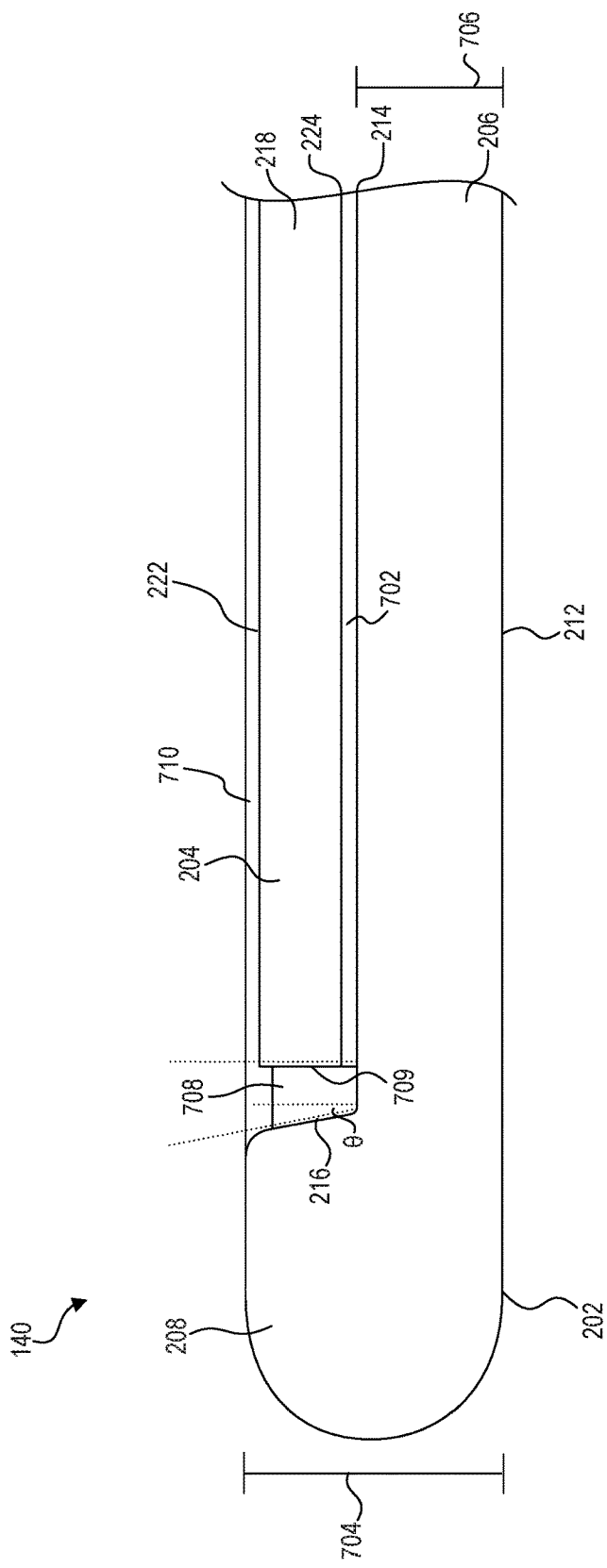
FIG. 7 is a cross-sectional illustration taken along line 5-5 of FIG. 3A, consistent with disclosed embodiments.

FIG. 7 illustrates a cross-sectional view of assembled transaction card 140, taken along line 5-5 of FIG. 3A. As shown, upper card component 204 may be positioned in space 216 of lower card component 202. An adhesive layer 702 may be placed between first interior surface 214 and second interior surface 224 to adhere bottom wall 206 to top wall 218. In this way, upper card component 204 may be secured to lower card component 202. Adhesive layer 702 may include any suitable adhesive material, such as a hot melt adhesive, pressure-sensitive adhesive, etc. It should be understood, however, that other means of attaching upper card component 204 to lower card component 202 may be used. For example, in some embodiments, upper card component 204 may be insert molded into lower card component 202. Specifically, upper card component may be placed into an injection mold and lower card component 202 may be injection molded around upper card component 204.

In some embodiments, an transaction component 144 may be positioned between first interior surface 224 and second interior surface 214. For example, an transaction component 144 may be embedded in adhesive layer 702. In other embodiments, one or more transaction components 144 may be positioned between adhesive layer 702 and either first interior surface 214 or second interior surface 224 (e.g., with a second adhesive layer interposed between the contacted surfaces (not pictured)). In still other embodiments, one or more transaction components 144 may be embedded within upper card component 204 and/or lower card component 202. In an embodiment, an EMV chip 230 (not pictured in FIG. 7) may be secured to first interior surface 214 via adhesive layer 702.

As shown in FIG. 7, a thickness of projecting wall 208 may define a thickness 704 of transaction card 140. In an embodiment, thickness 704 may be less than approximately 2 mm, which may be a thickness range for a transaction card 140 configured for contactless payments, for example. In another embodiment, the thickness of transaction card 140 may be less than approximately 1 mm. For example, projecting wall 208 may define a thickness of approximately 0.76 mm. It should be understood, however, that transaction card 140 may include any thickness that corresponds to a device that could be considered a transaction card 140. In some embodiments, projecting wall 208 may define a rounded edge. Bottom wall 206 may include a thickness 706 that is approximately one half of the thickness of projecting wall 208. For example, bottom wall 206 may include thickness 706 in a range of approximately 0.3-0.4 mm.

With upper card component 204 positioned in space 216 of lower card component 202, a gap 708 may be formed around a perimeter thereof, between a side surface 709 of upper card component 204 and an inner side of projecting wall 208, side surface 709 being generally perpendicular to second exterior surface 222. Gap 708 may provide a space for expansion and/or contraction of upper card component 204 and/or lower card component 202, and/or may allow for ease of removal upper card component 204 from lower card component 202 in applicable embodiments. In an embodiment, gap 708 may be approximately 0.15 mm. In addition, the inner side of projecting wall 208 may slope at an angle θ away from the side wall of upper card component 204. The slope of projecting wall 208 may help guide insertion of upper card component 204. In one example embodiment, the angle θ may be approximately 10 degrees. Gap 708 may additionally or alternatively be an aesthetic element of the ornamental design of transaction card 140.

Upper card component 204 may be positioned in space 216 such that second exterior surface 222 is at the same level as or below the top of projecting wall 208. For example, upper card component 204 may be thinner than a depth of space 216 such that upper card component 204 sits below flush by a space 710. In an embodiment, upper card component 204 (e.g., top wall 218) may include a thickness of approximately 0.30 mm, such that the space 710 is approximately 0.05 mm. In other embodiments, top wall 218 may be flush with a top of projecting wall 208 or top wall 218 (or a portion thereof) may extend above a top of projecting wall 208. Thus, a combined thickness of at least top wall 218 and bottom wall 206 may define thickness 704. In embodiments that include adhesive layer 702, thickness 704 may also include a thickness of adhesive layer 702. In an example embodiment, the total thickness of top wall 218 and adhesive layer 702 may be approximately 0.30 mm.

Figure 8A:
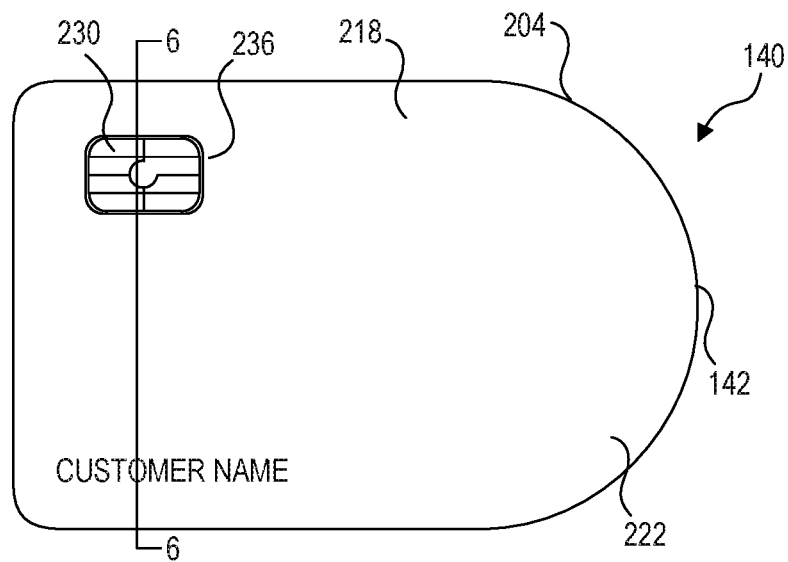
FIG. 8A is a top-view illustration of an embodiment of a transaction card, consistent with disclosed embodiments.
Figure 8B:
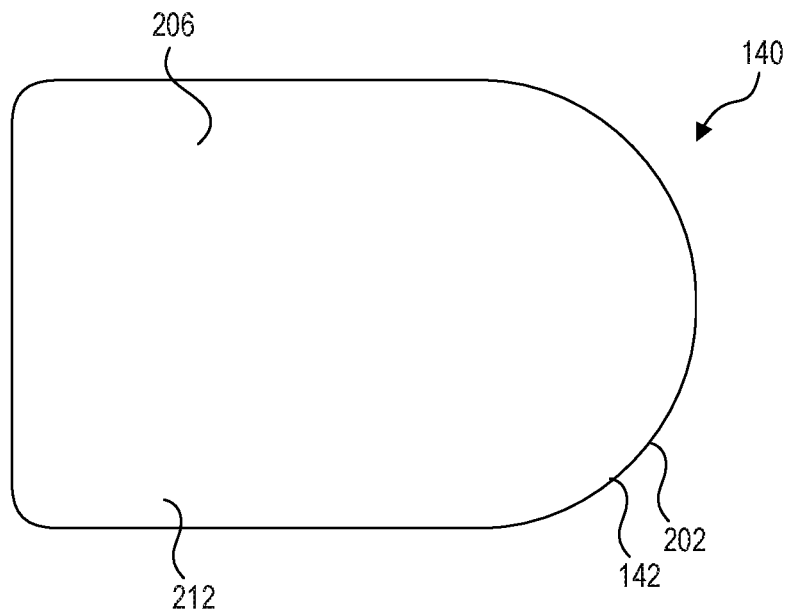
FIG. 8B is a bottom-view illustration of the transaction card of FIG. 8A.
Figure 9:
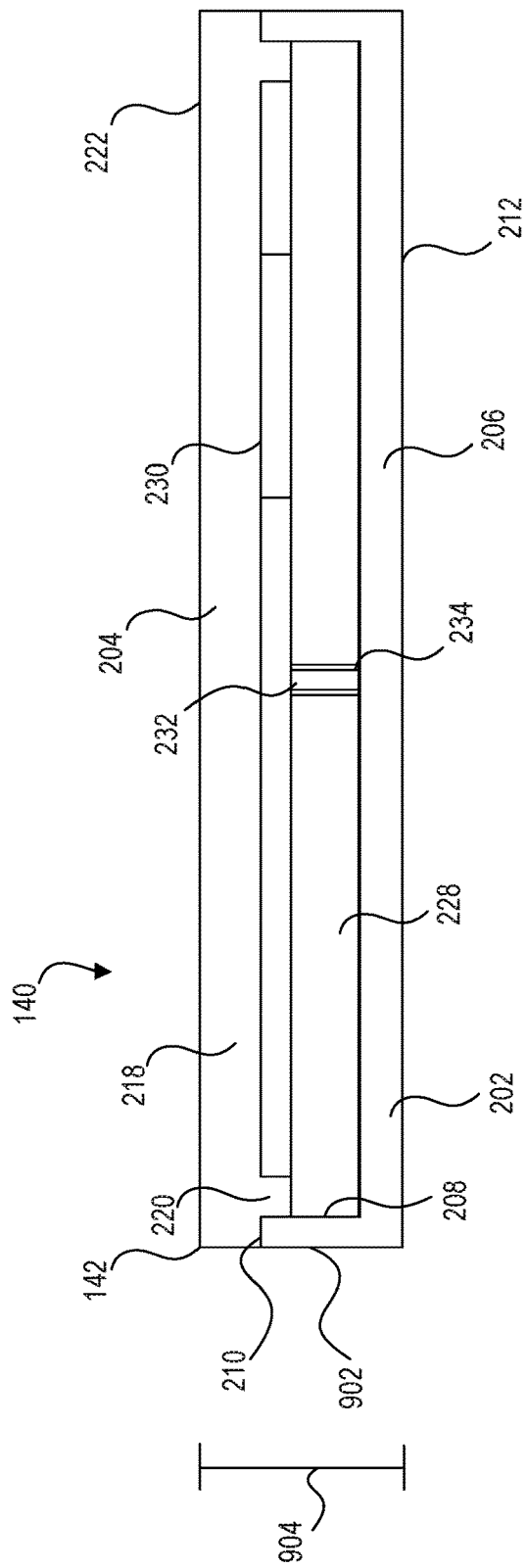
FIG. 9 is a cross-sectional illustration taken along line 6-6 of FIG. 8A, consistent with disclosed embodiments.

FIGS. 8A, 8B, and 9 illustrate another embodiment of transaction card 140. In particular, FIGS. 8A, 8B, and 9 illustrate an example of a transaction card 140 after it has been assembled. FIG. 8A illustrates a top-view of transaction card 140. FIG. 8B illustrates a bottom-view of transaction card 140. As shown in FIGS. 8A and 8B, transaction card 140 may include a generally planar first exterior surface 212 and a generally planar second exterior surface 222. Exterior surfaces 212, 222 may be similar in size to that of conventional transaction cards. Lower card component 202 and upper card component 204 may be configured such that exterior surfaces 212, 222, have any shape, as described, for example, in relation to FIGS. 3A-3B, 4A-4B, 5A-5B, and 6A-6B.

Exterior surfaces 212, 222 may form a majority of the exposed surface area of transaction card 140. One or more of exterior surfaces 212, 222 may include additional features (not shown), such as identifying information, additional components 144, visual features, and the like.

FIG. 9 illustrates a cross-sectional view of transaction card 140, taken along line 6-6 of FIG. 8A. As shown in FIG. 9, alignment feature 232 may pass through alignment feature 234 in order to position first transaction component 228 within 216. As also shown in FIG. 9, lower card component 202 and upper card component 204 may align with each other to form one continuous edge 902 that extends around a perimeter of and between exterior surfaces 212, 222. The continuous edge 902 may be at least partially defined by projecting wall 208. Continuous edge 902 may also be defined by one or more of bottom wall 206 and top wall 218. The continuous edge 902 may define a thickness 904 of transaction card 140, which may be similar in size to conventional transaction cards. For example, the thickness 904 of transaction card 140 may be less than 0.1 inches or less than 2 mm. These thicknesses are examples and transaction card 140 may be defined by other thicknesses.

In an embodiment, the components of transaction card 140 may be formed such that lower card component 202 may define approximately two-thirds of the thickness of transaction card 140, while upper card component 204 may define approximately one-third of the thickness of transaction card 140.

As shown in FIG. 9, lower card component 202 and upper card component 204, when combined, form a cavity at space 216 for receiving transaction components 144. The cavity may be formed by card frame 142 alone, and not necessarily dependent on transaction components 144 that may be positioned therein. In this way, card frame 142 may act as a shell for the insertion of any transaction components that may fit therein. This avoids the problem of previous transaction cards, where the transaction cards are manufactured for use in combination with specific transaction components. This feature allows transaction card 140 to be easily customizable, modular, and updatable. For example, new or different transaction component technology can be incorporated into a transaction card 140 without changing the construction of card frame 142.

Card frame 142 may be constructed out of various materials that provide additional advantages and customizability to transaction card 140. For example, card frame 142 may be constructed of soft touch plastics, hammered-texture materials, bead-blasted metals (e.g., aluminum), wooden materials (e.g., cherry, pine, ebony, oak, bamboo, etc.), sapphire crystal materials (both pure and doped with titanium), natural fiber composite materials, leather, ceramic materials, slate, etc. In some embodiments, card frame 142 may include additional material features, such as coverings (e.g., a silicone overmold), veneers (e.g., a wooden veneer), finishes (e.g. an oil-slick aluminum finish), or the like.

A number of factors may contribute to material choice based on any number of requirements for a transaction card. One of ordinary skill will understand that different materials have advantages that are useful in certain embodiments and use cases. For example, some materials may be used in part for low cost relative to other materials (e.g., soft touch plastic, aluminum, veneers, etc.). Other materials may be used in part for durability (e.g., natural fiber composite materials, sapphire crystal materials, metals, ceramic materials. etc.). Any number of specific aspects of durability may apply, for example resistance to one or more of cracking, shattering, material erosion, color fading, warping, shrinking, etc. Still other materials may be used based on a reputation for use in premium products as well as durability, weight, or visibility (e.g., sapphire crystal materials, hammered texture materials, natural fiber composite materials, leather, ceramic materials, slate, wooden materials, etc.). Material choice may also be based on other properties such as conductivity, compatibility with transaction card readers, water resistance, etc. The above examples are not intended to limit the numerous properties that may be associated with any particular material.

In some embodiments, lower card component 202 and upper card component 204 may be constructed out of different materials. For example, lower card component 202 may be constructed out of a plastic material. Upper card component 204, however, may be constructed out of a different material, such as a custom-selected material. The custom-selected material may include, for example, bamboo, ebony, copper, hammered metal, marble, or other materials that provide upper card with selected ornamental and/or performance characteristics, such as durability, strength, weight, rigidity, aesthetic design, color, contrast, uniqueness, etc., along with a distinctive look or feel. In this way, customers may customize the material of their respective transaction card 140. In other embodiments, lower card component 202 may be constructed out of a custom-selected material, such as those listed above or any other material selected for its ornamental and/or performance characteristics.

Lower card component 202 and upper card component 204 may be manufactured using a suitable process. In an embodiment, upper card component 204 may be manufactured using a process dependent on the type of material being used. For example, processes such as milling, grinding, sanding, hammering, injection molding, compression molding, and the like, may be used to construct upper card component 204. Lower card component 202 may also be manufactured using a process selected based on the material being used. In an embodiment, lower card component 202 may be constructed out of a plastic material using an injection molding process. Other processes that may be used to manufacture lower card component 202 include compression molding, milling, etc.

Figure 10A:
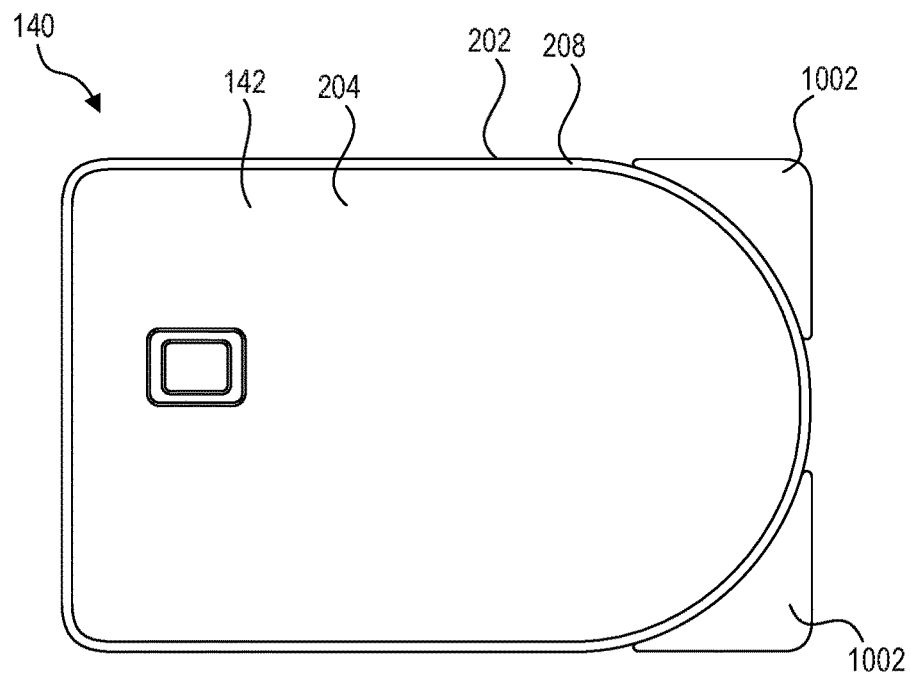
FIGS. 10A-10B are illustrations of an embodiment of a transaction card that includes tear-away portions, consistent with disclosed embodiments.
Figure 10B:
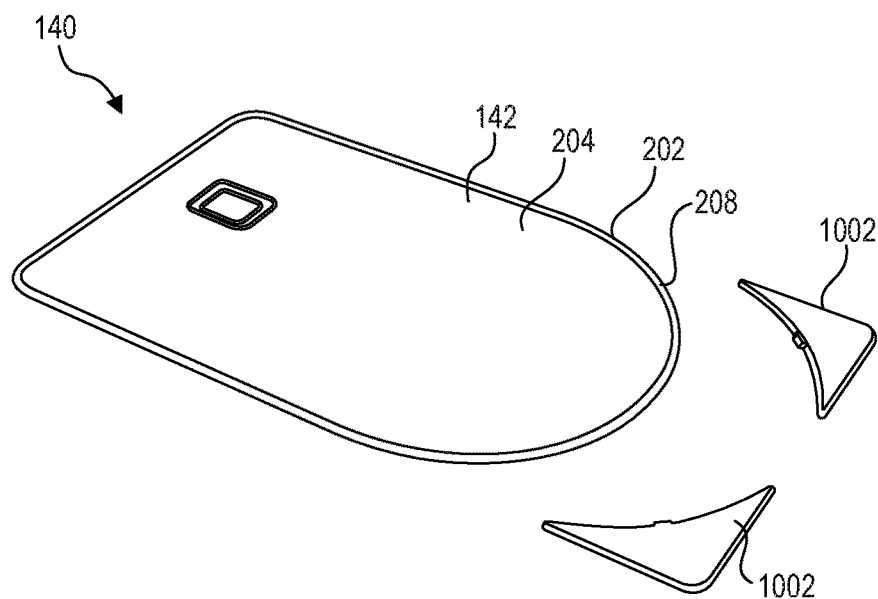

FIGS. 10A and 10B further illustrate transaction card 140 during a step of the manufacturing process. For example, lower card component 202 may be manufactured to include one or more tear away portions 1002. As shown in FIG. 10A, the tear away portions 1002 may be temporarily connected to a rounded end portion of lower card component 202. The tear away portions 1002, while attached to transaction card 140, may complete generally rectangular shape for transaction card 140. In this way, transaction card 140 may be at least temporarily in the shape of a conventional transaction card (e.g., a typical credit card). This shape may allow transaction card 140 to be used in existing machines that are designed to handle conventional rectangular cards. For example, this shape may allow transaction card 140 to be sent through a machine that adds printing, a magnetic stripe, visual design, etc.

After the transaction card 140 has completed any processes involving a machine that requires a rectangular shape, the tear away portions 1002 may be removed, as shown in FIG. 10B. This feature allows transaction card 140 to be used within conventional transaction card machinery, while also having any finished shape. It should be understood that the single rounded end shape depicted and described herein is one exemplary ornamental design and that transaction card 140 may have any finished shape. Tear away portions 1002 may be shaped to fill in the gaps of the finish shape of transaction card 140 to form a generally rectangular shape.

While illustrative embodiments have been described herein, the scope includes any and all embodiments having equivalent elements, modifications, omissions, combinations (e.g., of aspects across various embodiments), adaptations or alterations based on the present disclosure. For example, in some embodiments, a single piece transaction card may be used (e.g., a transaction card 140 with no inlay or bucket/lid), where the single piece transaction card may include one or more of the features described herein (e.g., customized material, rounded edges, tear away portions, etc.).

The present teachings may also extend to one or more of the following numbered clauses:

1. A transaction card, comprising:
   a card frame, including:
      a generally planar first card component including a first surface;
      a generally planar second card component including a second surface and defining a cavity,
      wherein the first card component is separate from the second card component and insertable into the cavity,
      wherein, when the first card component is in the cavity, the first surface forms a first exterior surface and the second surface forms a second exterior surface, and
      wherein the transaction card is defined by a thickness of less than approximately 2 mm.
2. The transaction card of clause 1, wherein:
   the first card component is an inlay component including a first wall having the first surface and a third surface, and
   the second card component is a container component including:
      a second wall having the second surface and a fourth surface; and
      a projecting wall extending from the second wall and defining the cavity.
3. The transaction card of clause 2, wherein the third surface is attached to the fourth surface.
4. The transaction card of clause 3, wherein the third surface is attached to the fourth surface by an adhesive layer.
5. The transaction card of clause 2, further including an electronic component disposed between the third surface and the fourth surface.
6. The transaction card of clause 5, wherein the electronic component is embedded in an adhesive layer attaching the third surface to the fourth surface.
7. The transaction card of clause 5, wherein the electronic component comprises at least an NFC antenna.
8. The transaction card of clause 1, wherein the first card component includes an opening for receiving at least a portion of an electronic component.
9. The transaction card of clause 1, wherein the first card component is removable from attachment with the second card component.
10. The transaction card of clause 1, wherein the transaction card is configured for use in conducting a financial transaction.
11. The transaction card of clause 1, wherein the first card component is manufactured from a first material and the second card component is manufactured from a second material, and wherein the first material is different than the second material.
12. The transaction card of clause 11, wherein the second material is a PC plastic material.
13. The transaction card of clause 12, wherein the first material is one or more of a soft touch plastic, hammered-texture material, bead-blasted metal, wooden material, sapphire crystal material, natural fiber composite material, leather, ceramic material, or slate.
14. The transaction card of clause 12, wherein the first material is of bamboo, ebony, copper, hammered metal, or marble.
15. The transaction card of clause 2, wherein the first card component is inserted into the cavity such that the first surface sits below a level of a top of the projecting wall.
16. The transaction card of clause 2, wherein the inner side of the projecting wall slopes away from the side wall of the first card component at an angle of approximately 10 degrees.
17. A method of manufacturing a transaction card, comprising:
   forming a generally planar first card component from a first material;
   forming a generally planar second card component from a second material, the second card component including a cavity;
   inserting the first card component into the cavity and attaching the first card component to the second card component,
   wherein the first material is different than the second material, and
   wherein the transaction card is defined by a thickness of less than approximately 2 mm.
18. The method of clause 17, wherein forming the generally planar second card component includes an injection molding process.

19. The method of clause 17, wherein forming the generally planar second card component includes forming at least one tear away portion, the tear away portion completing a generally rectangular shape for the transaction card and being removable from the second card component such that the transaction card includes a finished shape that is not rectangular.

20. A transaction card, comprising:
a card frame, including:
a generally planar first card component defining a space; and
a generally planar second card component, separate from the first card component and attachable thereto to at least partially enclose the space,
wherein the card frame is configured to hold at least one electronic component in the space, and
wherein the transaction card is defined by a thickness that is less than 0.10 inches.

21. The transaction card of clause 20, wherein the first card component comprises:
a first wall defining a first side of the transaction card; and
a projecting wall extending away from the first wall, and wherein the first wall and the projecting wall at least partially define the space.

22. The transaction card of clause 21, wherein the projecting wall defines at least a portion of a thickness of the transaction card.

23. The transaction card of clause 21, wherein the first card component further comprises a lip defining a support surface.

24. The transaction card of clause 23, wherein the second card component comprises a second wall defining a second side of the transaction card, the second wall contacting the support surface.

25. The transaction card of clause 24, wherein the second card component further comprises an alignment wall extending away from the second wall at a distance spaced from an edge of the second wall, and wherein the alignment wall guides attachment of the second card component to the first card component.

26. The transaction card of clause 20, wherein at least one of the first card component and the second card component include an alignment feature.

27. The transaction card of clause 26, wherein the alignment feature includes an opening for receiving at least a portion of an electronic component.

28. The transaction card of clause 20, wherein the first card component is removable from attachment with the second card component.

29. The transaction card of clause 20, wherein the transaction card is configured for use in conducting a financial transaction.

30. A transaction card, comprising:
a card frame, including:
a generally planar first card component defining a space; and
a generally planar second card component, separate from the first card component and attachable thereto to at least partially enclose the space; and
at least one electronic component at least partially positioned within the space,
wherein the transaction card is configured for use in conducting a financial transaction.

31. The transaction card of clause 30, wherein the first card component comprises:
a first wall defining a first side of the transaction card; and
a projecting wall extending away from the first wall, and wherein the first wall and the projecting wall at least partially define the space.

32. The transaction card of clause 31, wherein the projecting wall defines at least a portion of a thickness of the transaction card.

33. The transaction card of clause 31, wherein the first card component further comprises a lip defining a support surface.

34. The transaction card of clause 33, wherein the second card component comprises a second wall defining a second side of the transaction card, the second wall contacting the support surface.

35. The transaction card of clause 34, wherein the second card component further comprises an alignment wall extending away from the second wall at a distance spaced from an edge of the second wall, and wherein the alignment wall guides attachment of the second card component to the first card component.

36. The transaction card of clause 30, wherein at least one of the first card component and the second card component include an alignment feature.

37. The transaction card of clause 36, wherein the alignment feature includes an opening for receiving at least a portion of the at least one electronic component.

38. The transaction card of clause 30, wherein the at least one electronic component includes at least one of an NFC antenna or an EMV chip.

39. The transaction card of clause 30, wherein the transaction card is defined by a thickness that is less than 0.10 inches.

The elements in the following claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:
1. A transaction card, comprising:
a card frame, including:
a first card component comprising a first card surface;
a second card component comprising a second card surface and a third card surface opposite the second card surface, and a cavity formed in the second card surface; and
a transaction component disposed between the first card component and the second card component,
wherein the first card component is separate from the second card component, and wherein the first card component is at least partially insertable into the cavity,
wherein a thickness of the first card component is greater than a depth of the cavity such that, when the first card component is in the cavity, a top surface of the first card component extends above a top surface of the second card component, and
wherein a gap is formed around a perimeter of the first card component between a side surface of the first card component and an inner side surface of the cavity.

2. The transaction card of claim 1, wherein the transaction component further comprises a plurality of openings and the second card component comprises a plurality of posts configured to be placed through the plurality of openings.

3. The transaction card of claim 1, wherein:
the first card component further comprises a first wall having the first card surface and a fourth card surface; and
the second card component further comprises a second wall having the second surface and a fifth card surface, and a projecting wall extending from the second wall and defining the cavity.

4. The transaction card of claim 3, wherein the transaction component is embedded in an adhesive layer attaching the fourth card surface to the fifth card surface.

5. The transaction card of claim 4, wherein a thickness of the adhesive layer is about 0.30 mm.

6. The transaction card of claim 3, wherein an inner side of the projecting wall slopes away from the side surface of the first card component at an angle of approximately 10 degrees, the side surface being generally perpendicular to the first card surface.

7. The transaction card of claim 1, wherein the first card component further comprises a lip defining a support surface.

8. The transaction card of claim 1, wherein the first card component is manufactured from a first material and the second card component is manufactured from a second material, the first material being different than the second material.

9. The transaction card of claim 8, wherein the first material and the second material are selected from plastic, metal, wood, sapphire crystal, natural fiber composite, leather, ceramic, or slate.

10. The transaction card of claim 1, wherein the transaction card comprises at least one of a triangular card, a card with rounded edges, or a card with scalloped edges.

11. The transaction card of claim 1, wherein the transaction component further comprises at least one of an NFC antenna or an EMV chip.

12. The transaction card of claim 1, wherein the first card component further comprises a window configured to allow at least a portion of the transaction component to project therethrough.

13. A method of manufacturing a transaction card, comprising:
forming a first card component from a first material, the first card component comprising a first card surface;
forming a second card component from a second material, the second card component comprising a second card surface and a third card surface opposite the second card surface;
forming a cavity in the second card surface;
disposing a transaction component between the first card component and the second card component; and
inserting the first card component into the cavity and removably attaching the first card component to the second card component,
wherein a thickness of the first card component is greater than a depth of the cavity such that, when the first card component is inserted into the cavity, a top surface of the first card component extends above the second card surface of the second card component, and
wherein a gap is formed around a perimeter of the first card component between a side surface of the first card component and an inner side surface of the cavity.

14. The method of claim 13, further comprising:
forming a plurality of openings on the transaction component; and
forming a plurality of posts on the second card component,
wherein the plurality of posts are configured to be placed through the plurality of openings.

15. The method of claim 13, wherein:
the first card component further comprises a first wall having the first card surface and a fourth card surface; and
the second card component further comprises a second wall having the second card surface and a fifth card surface, and a projecting wall extending from the second wall and defining the cavity.

16. The method of claim 15, wherein an inner side of the projecting wall slopes away from the side surface of the first card component at an angle of approximately 10 degrees, the side surface being generally perpendicular to the first surface.

17. The method of claim 13, further comprising forming a lip on the first card component, the lip defining a support surface.

18. The method of claim 13, further comprising forming a plurality of windows on the first card component, the windows configured to allow electronic components of the transaction component to project therethrough.

19. The method of claim 18, wherein the electronic components comprise at least one of an NFC antenna or an EMV chip.

20. The method of claim 13, wherein the first material and the second material are selected from wood, sapphire crystal, natural fiber composite, ceramic, or slate.

* * * * *